United States Patent
Hattori et al.

(10) Patent No.: US 9,722,474 B2
(45) Date of Patent: Aug. 1, 2017

(54) INVERTER-INTEGRATED ELECTRIC COMPRESSOR

(71) Applicant: MITSUBISHI HEAVY INDUSTRIES AUTOMOTIVE THERMAL SYSTEMS CO., LTD., Kiyosu-shi, Aichi (JP)

(72) Inventors: Makoto Hattori, Aichi (JP); Masahiko Asai, Aichi (JP)

(73) Assignee: MITSUBISHI HEAVY INDUSTRIES AUTOMOTIVE THERMAL SYSTEMS CO., LTD., Aichi (JP)

( * ) Notice: Subject to any disclaimer, the term of this patent is extended or adjusted under 35 U.S.C. 154(b) by 111 days.

(21) Appl. No.: 14/654,995

(22) PCT Filed: Dec. 25, 2013

(86) PCT No.: PCT/JP2013/084766
§ 371 (c)(1),
(2) Date: Jun. 23, 2015

(87) PCT Pub. No.: WO2014/129085
PCT Pub. Date: Aug. 28, 2014

(65) Prior Publication Data
US 2015/0349613 A1 Dec. 3, 2015

(30) Foreign Application Priority Data
Feb. 21, 2013 (JP) .................. 2013-032185

(51) Int. Cl.
*H02K 11/00* (2016.01)
*H02K 11/02* (2016.01)
(Continued)

(52) U.S. Cl.
CPC .......... *H02K 11/0073* (2013.01); *F04B 35/04* (2013.01); *F04B 39/121* (2013.01);
(Continued)

(58) Field of Classification Search
CPC .. F04B 35/04; F04B 39/121; F04C 2240/808; H02K 11/0073; H02K 11/33; H02K 5/225; H02K 11/024; H02M 7/003
(Continued)

(56) References Cited

U.S. PATENT DOCUMENTS 4,885,629 A * 12/1989 Takagi .................. H01L 25/072
257/690
5,430,326 A 7/1995 Miyashita
(Continued)

FOREIGN PATENT DOCUMENTS

| CN | 101573535 A | 11/2009 |
|---|---|---|
| CN | 101707433 A | 5/2010 |

(Continued)

OTHER PUBLICATIONS

Chinese Office Action issued Feb. 3, 2017 for Chinese Patent Application No. 201380068086.5 with an English Translation.
(Continued)

*Primary Examiner* — Alex W Mok
(74) *Attorney, Agent, or Firm* — Birch, Stewart, Kolasch & Birch, LLP

(57) ABSTRACT

The purpose of the present invention is to provide an inverter-integrated electric compressor which, even with the connector of a power source-side cable configured to be connected directly to a P-N terminal on a circuit board, reduces the stress on the circuit board by support by a high voltage electric component and can implement this support with high precision. This inverter-integrated electric compressor is configured such that a P-N terminal for inputting high-voltage DC power is provided on a main circuit board, a power source-side cable can be connected to said P-N terminal by inserting a connector provided on one end, a high-voltage electric component configuring the inverter device is arranged in the facing position on the side of the main circuit board opposite that of the P-N terminal, and the
(Continued)

electric component is housed in a case and fixed by a resin member; and is further configured such that multiple protruding and receding portions are formed on the edge of the top opening of the case, and stress on the main circuit board when the connector is plugged in is received by the protruding portions abutting against the bottom surface of the main circuit board.

5 Claims, 6 Drawing Sheets

(51) Int. Cl.
    *H02K 5/22*     (2006.01)
    *F04B 35/04*     (2006.01)
    *F04B 39/12*     (2006.01)
    *H02K 11/33*     (2016.01)
    *H02M 7/00*     (2006.01)

(52) U.S. Cl.
    CPC ........... *H02K 5/225* (2013.01); *H02K 11/024* (2013.01); *H02K 11/33* (2016.01); *F04C 2240/808* (2013.01); *H02M 7/003* (2013.01)

(58) Field of Classification Search
    USPC .......................................................... 310/71
    See application file for complete search history.

(56) References Cited

U.S. PATENT DOCUMENTS

| | | | | |
|---|---|---|---|---|
| 6,954,368 B1* | 10/2005 | Francoeur | ............. | H02M 7/003 361/763 |
| 7,019,987 B2* | 3/2006 | Onoe | ...................... | H02J 1/102 363/17 |
| 8,441,160 B2* | 5/2013 | Watanabe | ............. | F04B 39/121 310/51 |
| 8,785,777 B2* | 7/2014 | Yasukawa | ......... | B29C 45/14065 174/68.2 |
| 2011/0187213 A1* | 8/2011 | Kitagawa | ............... | H02K 5/225 310/71 |
| 2011/0285226 A1* | 11/2011 | Fujita | ................ | H01L 23/49562 310/71 |
| 2012/0160596 A1* | 6/2012 | Yamasaki | ............ | B62D 5/0406 180/443 |
| 2012/0237376 A1 | 9/2012 | Kinoshita et al. | | |
| 2013/0049550 A1 | 2/2013 | Watanabe et al. | | |

FOREIGN PATENT DOCUMENTS

| | | |
|---|---|---|
| CN | 102678510 A | 9/2012 |
| EP | 1 034 983 A2 | 9/2000 |
| JP | 6-013639 A | 1/1994 |
| JP | 11-135965 A | 5/1999 |
| JP | 2000-261160 A | 9/2000 |
| JP | 2007-295639 A | 11/2007 |
| JP | 4898931 B2 | 3/2012 |
| JP | 2012-193660 A | 10/2012 |
| JP | 2012-209414 A | 10/2012 |

OTHER PUBLICATIONS

Decision to Grant a Patent issued Jan. 17, 2017 in Japanese Patent Application No. 2013-032185.

* cited by examiner

INVERTER-INTEGRATED ELECTRIC COMPRESSOR

TECHNICAL FIELD

The present invention relates to an inverter-integrated electric compressor in which an inverter device is integrally incorporated into a housing of the electric compressor.

BACKGROUND ART

Inverter-integrated electric compressors, which integrally incorporate inverter devices, are used as air conditioner compressors installed in electric vehicles, hybrid vehicles, and the like. Such inverter-integrated electric compressors are configured so that high voltage direct current power supplied from a power supply unit installed in the vehicle is converted by an inverter device to three-phase alternating current power of a specified frequency, which is then applied to the electric motor so as to drive the electric motor.

The inverter device comprises a plurality of high-voltage electrical components, such as a coil and a capacitor, constituting a noise-removing filter circuit, a plurality of semiconductor switching elements, such as IGBTs, constituting a switching circuit for converting power, an inverter circuit including the filter circuit and the switching circuit, and a circuit board on which a control circuit of the inverter circuit is mounted, and is used to convert direct current power inputted via a P-N terminal into three-phase alternating current power, and output the three-phase alternating current power from a UWV terminal to the motor. The inverter device is incorporated into an inverter housing section provided on the outer circumference of a housing of the electric compressor, thereby integrating the inverter device into the compressor.

A power source cable for supplying direct current power from a power source to the inverter device, as disclosed, for example, in Patent Document 1, is configured so as to connect via a connector of the power source cable to a connector connection section provided on the inverter housing section side, and from there to the P-N terminal on the control circuit board side via a resin circuit board comprising a direct current power line constituted by a terminal block and a wiring pattern, a filter circuit constituted by an inductor coil and a smoothing capacitor provided on the resin circuit board, a busbar assembly, and the like.

Patent Document 2 discloses an arrangement in which a power source input port formation part is formed on a metal inverter cover for closing off an inverter housing space in which is disposed a circuit board on which are mounted a coil and capacitor for a filter circuit, a metal terminal is resin insert molded at the port formation part to provide an integrated resin power source connector, and a power source cable is connected to the power source connector and anchored to the housing of the inverter cover, thereby connecting the metal terminal of the power source connector to the circuit board. Patent Document 3 discloses an arrangement in which a power converter board is anchored and disposed on an interior surface of a circuit board cover with an elastic member sandwiched therebetween, a coil and capacitor for a filter circuit are disposed on a surface facing a housing, and the lower parts of the coil and condenser are inserted into and disposed in recessions in the housing.

PRIOR ART LITERATURE

Patent Literature

Patent Document 1: Japanese Patent No. 4898931
Patent Document 2: Japanese Unexamined Patent Application Publication No. 2012-193660A
Patent Document 3: Japanese Unexamined Patent Application Publication No. 2007-295639A

SUMMARY OF INVENTION

Problem to be Solved by the Invention

However, the arrangement disclosed in Patent Document 1 presents problems in that it is necessary to provide the direct-current power input system from the power source cable with a terminal block, resin circuit board, busbar, and the like, and connect the high-voltage electrical components, such as the filter circuit coil and smoothing capacitor, thus increasing the number of parts in the inverter device, complicating the configuration thereof, and increasing costs and size; and, because a busbar connecting section is necessary, it is difficult to ensure reliability.

In the arrangement disclosed in Patent Document 2, a plurality of electrical components for use in the filter circuit is mounted on the circuit board, and an integrated power source connector for connecting the power source cable to the inverter cover is provided; the metal terminal thereof need only be connected to the circuit board when the inverter cover is being mounted, thus allowing the configuration of the direct-current power input system to be simplified. However, there is a problem in that excess force may be placed upon the circuit board when the terminal is inserted when connecting the metal terminal to the circuit board, leading to the risk of the stress caused thereby damaging the circuit board or damaging the mounting components. Patent Document 3 discloses an arrangement in which a coil and capacitor are disposed on the rear side of the power converter board; however, this arrangement does not alleviate the stress placed upon the circuit board during terminal insertion as described above.

The present invention was conceived in view of the circumstances described above, and has an object of providing an inverter-integrated electric compressor in which stress placed upon a main circuit board is borne and alleviated by a high-voltage electrical component even upon a connector of a power source cable being directly connected to a P-N terminal provided on the main circuit board, the bearing of stress being effected at high precision.

Solution to Problem

The inverter-integrated electric compressor of the present invention employs the following means to solve the problems described above.

Specifically, an inverter-integrated electric compressor according to one aspect of the present invention is an inverter-integrated electric compressor having an integrated inverter device incorporated in an inverter housing section provided on the outer circumference of a housing, the compressor including a P-N terminal configured to input high-voltage direct-current power provided on a main circuit board of the inverter device, a power source cable being able to be connected by inserting a connector provided at one end of the cable into the P-N terminal; a high-voltage electrical component constituting the inverter device provided at a position across from the P-N terminal on the opposite side of the main circuit board; the electrical component being housed within a case and anchored in place by a resin material, a plurality of raised and recessed sections being provided on a circumferential edge of an opening in an upper end of the case, and the raised sections being brought into contact with the undersurface of the main circuit board so as to bear stress placed upon the main circuit board when the connector is inserted.

In accordance with the aspect described above, the P-N terminal configured to input high-voltage direct-current power is provided on the main circuit board of the inverter device, and the power source cable is able to be connected by inserting the connector provided at one end of the cable into the P-N terminal; a high-voltage electrical component constituting the inverter device is provided at a position across from the P-N terminal on the opposite side of the main circuit board; the electrical component is housed within the case and anchored in place by the resin material, a plurality of raised and recessed sections is provided on a circumferential edge of an opening in the upper end of the case, and the raised sections are brought into contact with the undersurface of the main circuit board so as to bear stress placed upon the main circuit board when the connector is inserted, thus allowing stress placed upon the main circuit board when the connector is inserted to be alleviated by being borne by the high-voltage electrical component disposed at a position across from the P-N terminal on the opposite side of the main circuit board, even in arrangements in which the power source cable is directly connected to the P-N terminal provided on the main circuit board by inserting the connector provided at one end of the power source cable. It is thus possible to reliably eliminate occurrence of damage to the main circuit board or the components mounted thereupon due to stress caused by exerting excessive pressing force when inserting the connector. In addition, the terminal block, busbar, and the like previously provided in the direct-current power input system are omitted, reducing the number of components in the inverter device, with the result that device configuration can be simplified, costs, size, and weight can be reduced, and the reduction in the number of busbar connections allows for a reduction in the number of manufacturing steps and improved reliability. The provision of a plurality of raised and recessed sections on the circumferential edge of the opening in the upper end of the case housing the electrical component, with the raised sections thereof supporting the undersurface of the main circuit board, allows any resin material filling the case that overflows when the electrical component is housed in the case and anchored in place with resin material to escape through the recessed sections, thereby making it possible to maintain the dimensional precision of the upper surfaces of the raised sections supporting the circuit board, support the main circuit board with high precision, and ensure inverter device assembly precision.

An inverter-integrated electric compressor according to one aspect of the present invention may be the inverter-integrated electric compressor described above, wherein the electrical component is a smoothing capacitor constituting a noise-removing filter circuit provided on a high-voltage direct-current power line of the inverter device.

In accordance with this aspect, the electrical component is a smoothing capacitor constituting a noise-removing filter circuit provided on a high-voltage direct-current power line of the inverter device, thereby allowing the smoothing capacitor, which is housed within the case and has a square outline, to be disposed at a position across from the P-N terminal on the opposite side of the main circuit board, with the result that the capacitor can be used without modification as an electrical component that stably bears stress placed upon the main circuit board. Accordingly, by using an existing electrical component and modifying the manner in which the component is disposed so that it can be used as a member for bearing stress placed upon the main circuit board, an arrangement in which a power source cable is directly connected to the P-N terminal provided on the main circuit board is made possible, allowing the number of parts, cost, size, weight, and the like of the inverter device to be reduced.

An inverter-integrated electric compressor according to one aspect of the present invention may be the inverter-integrated electric compressor described above, wherein the electrical component is a coil constituting a noise-removing filter circuit provided on a high-voltage direct-current power line of the inverter device.

In accordance with this aspect, the electrical component is a coil constituting a noise-removing filter circuit provided on a high-voltage direct-current power line of the inverter device, thereby allowing the coil housed within the case, which has a flat upper surface, to be disposed at a position across from the P-N terminal on the opposite side of the main circuit board, with the result that the capacitor can be used without modification as an electrical component that stably bears stress placed upon the main circuit board. Accordingly, by using an existing electrical component and modifying the manner in which the component is disposed so that it can be used as a member for bearing stress placed upon the main circuit board, an arrangement in which a power source cable is directly connected to the P-N terminal provided on the main circuit board is made possible, allowing the number of parts, cost, size, weight, and the like of the inverter device to be reduced.

An inverter-integrated electric compressor according to another aspect of the present invention may be any of the inverter-integrated electric compressors described above, wherein the case housing the electrical component has a rectangular shape as seen in plan view, and the plurality of raised and recessed sections provided on the circumferential edge of the opening in the upper end thereof are provided in alternation and so that at least one raised section is present on each side of the opening.

In accordance with this aspect, the case housing the electrical component has a rectangular shape as seen in plan view, and the plurality of raised and recessed sections provided on the circumferential edge of the opening in the upper end thereof is provided in alternation and so that at least one raised section is present on each side of the opening, thereby allowing stress placed upon the main circuit board when the connector is inserted into the P-N terminal to be dispersed and borne by the one or more raised sections provided on each of the rectangle-forming circumferential edge of the case housing the electrical component, and ensuring the dimensional precision of the upper surfaces of the raised sections supporting the circuit board by allowing any resin material filling the case that overflows when the electrical component is housed within the case and anchored with resin material during fabrication to escape through the recessed sections. Accordingly, stress placed upon the main circuit board can be greatly mitigated, damage to the main circuit board or the components mounted thereupon can be reliably prevented, the main circuit board can be supported evenly and with high precision and precision in assembling the inverter device can be ensured.

An inverter-integrated electric compressor according to another aspect of the present invention may be any of the inverter-integrated electric compressors described above, wherein the connector provided at one end of the power source cable is provided at a position corresponding to that of the P-N terminal on the side of a lid for closing off the inverter housing section, and can be inserted into the P-N terminal when the lid is mounted in place.

In accordance with this aspect, the connector provided at one end of the power source cable is provided at a position corresponding to that of the P-N terminal on the side of the lid for closing off the inverter housing section, and can be inserted into the P-N terminal when the lid is mounted in place, with the result that, after the inverter device has been housed and set in position, the power source cable can be simultaneously connected to the P-N terminal of the inverter device as the lid is mounted in place, thus closing off the inverter housing section, by inserting the connector disposed on the inner surface of the lid into the P-N terminal. As a result, the connection structure of the power source cable and the process of connecting the cable can be simplified, and the connector can be reliably inserted into the P-N terminal without placing excessive stress upon the main circuit board even if the connector is engaged by pressing on the lid with somewhat excessive force.

Advantageous Effect of Invention

In accordance with the present invention, stress placed upon the main circuit board when the connector provided at one end of the power source cable is inserted into the P-N terminal provided on the main circuit board is alleviated by being borne by the high-voltage electrical component disposed at a position across from the P-N terminal on the opposite side of the main circuit board, even in arrangements in which the power source cable is directly connected via the insertion of the connector, thereby allowing for the reliable elimination of occurrence of damage to the main circuit board or the components mounted thereupon due to stress caused by excessive pressing force when inserting the connector. In addition, the terminal block, busbar, and the like previously provided in the direct-current power input system are omitted, reducing the number of components in the inverter device, with the results that device configuration can be simplified, costs, size, and weight can be reduced, and the reduction in the number of busbar connections allows for a reduction in the number of manufacturing steps and improved reliability. In addition, the provision of a plurality of raised and recessed sections on the circumferential edge of the opening in the upper end of the case housing the electrical component, with the raised sections thereof supporting the undersurface of the main circuit board, allows any resin material filling the case that overflows when the electrical component is housed in the case and anchored in place with resin material to escape through the recessed sections, thereby making it possible to maintain the dimensional precision of the upper surfaces of the raised sections supporting the circuit board, support the main circuit board with high precision, and ensure inverter device assembly precision.

DESCRIPTION OF EMBODIMENTS

An embodiment of the present invention will be described below with reference to FIGS. 1 to 6.

Figure 1:
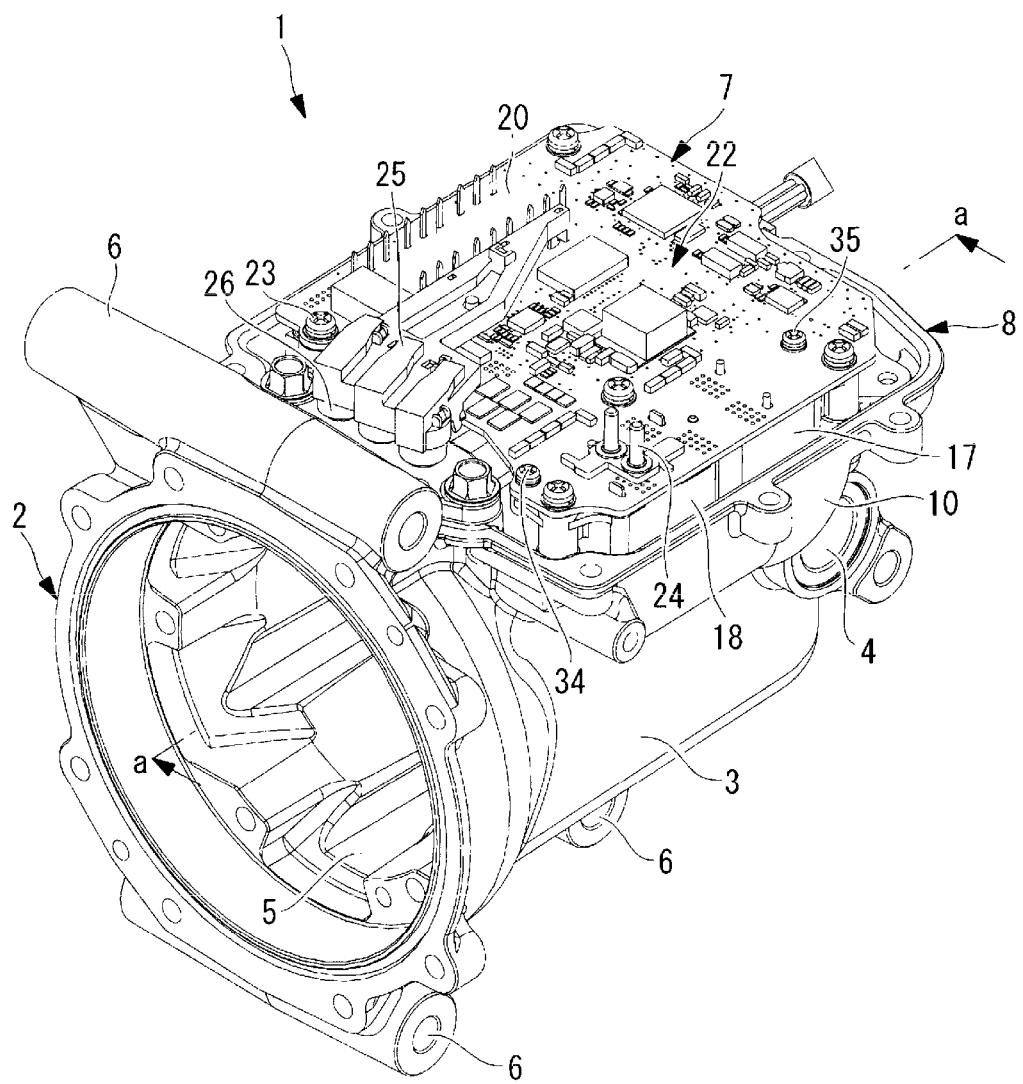
FIG. 1 is a perspective view illustrating a configuration of the main components of an inverter-integrated electric compressor according to an embodiment of the present invention.
Figure 2:
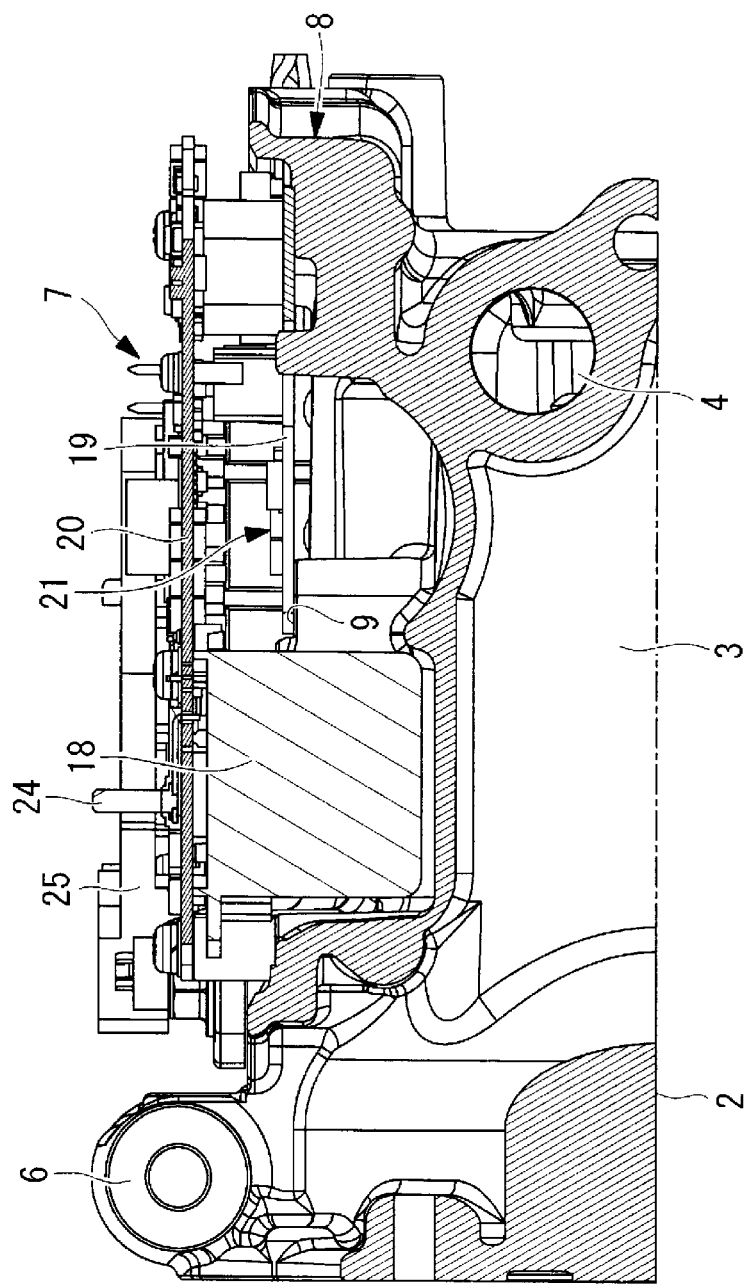
FIG. 2 is a corresponding longitudinal cross-sectional view along line a-a in FIG. 1.
Figure 3:
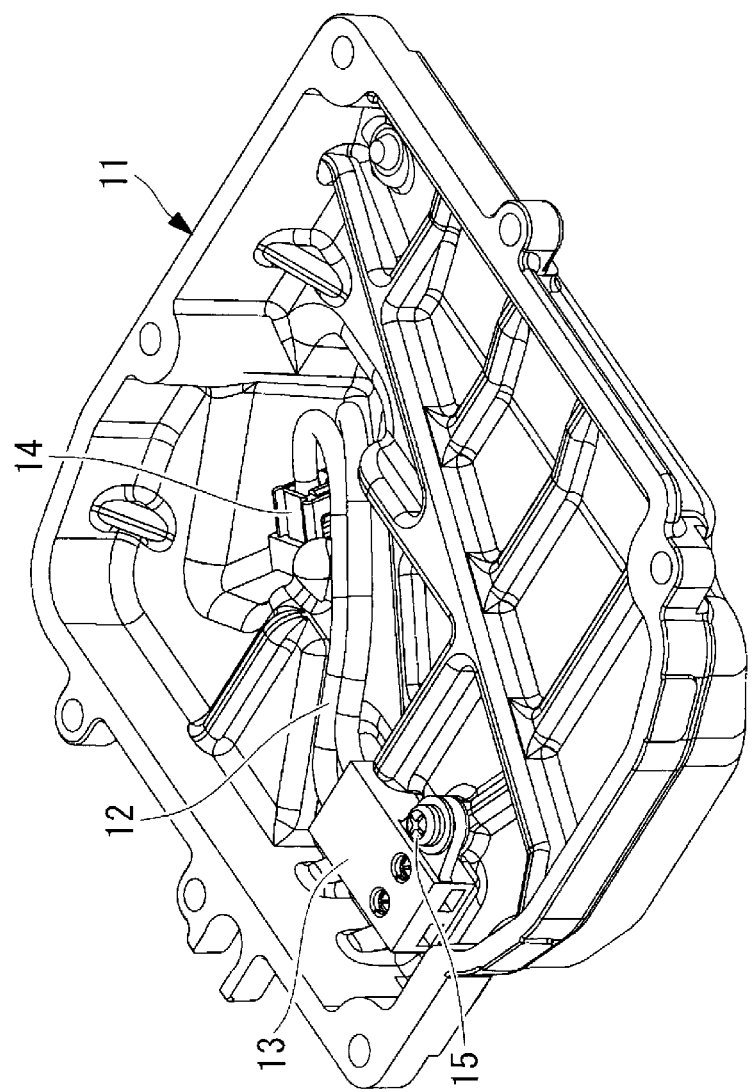
FIG. 3 is a perspective rear view of a lid that closes off an inverter housing section of the inverter-integrated electric compressor.
Figure 4:
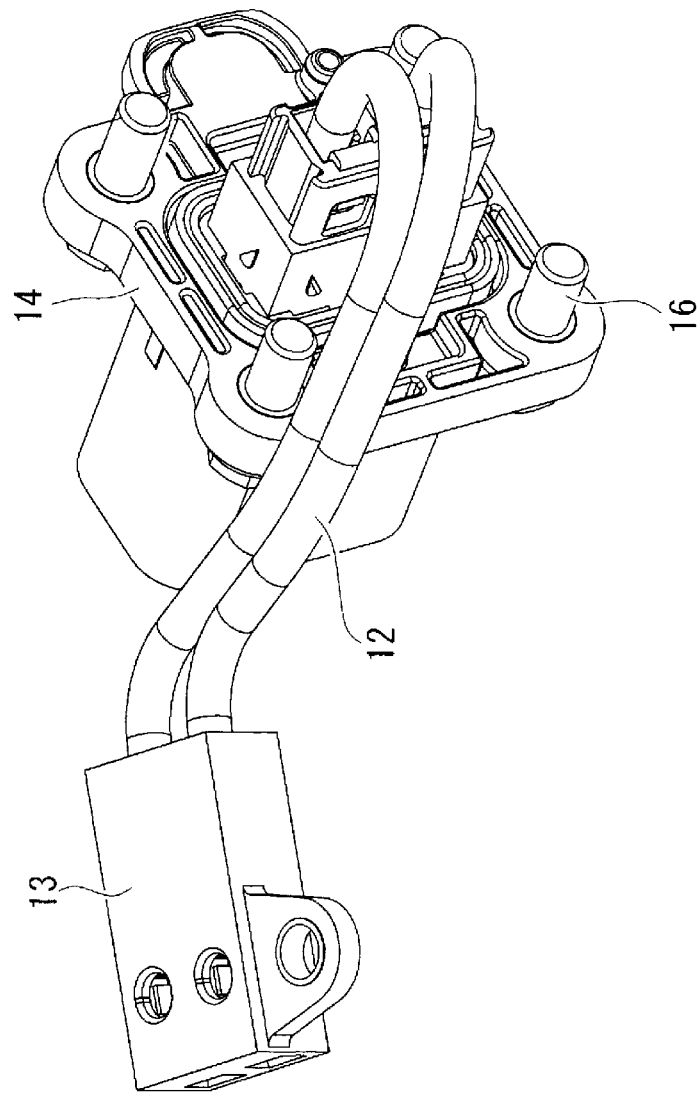
FIG. 4 is a perspective view of a power source cable unit connected to the lid.

FIG. 1 is a perspective view of main components of an inverter-integrated electric compressor according to an embodiment of the present invention, FIG. 2 is a longitudinal cross-sectional view along line a-a in FIG. 1, FIG. 3 is a perspective rear view of a lid that closes off an inverter housing section, and FIG. 4 is a perspective view of a power source cable unit.

An inverter-integrated electric compressor 1 is provided with a cylindrical housing 2 constituting an outer shell. The housing 2 is constituted by a motor housing 3 into which an electric motor (not illustrated) is built, and a compressor housing (not illustrated) into which a compression mechanism (not illustrated) is built, the two housings being joined together into a single whole.

The inverter-integrated electric compressor 1 is configured so that the electric motor and compression mechanism built into the housing 2 are linked by a rotary shaft, and the compression mechanism is driven when the electric motor is rotationally driven via an inverter device 7 described below, thereby causing low-pressure refrigerant gas that has been drawn into the interior of the motor housing 3 via an intake port 4 disposed in a side wall on the rear end of the motor housing 3 to be drawn in around the electric motor, compressed to a high pressure by the compression mechanism, discharged within the compressor housing, and then expelled to the outside.

A plurality of refrigerant flow paths 5 are formed in the motor housing 3 so as to allow refrigerant to flow in the axial direction along the inner circumferential surface thereof, and a plurality of legs 6 for installing the electric compressor 1 are provided on the outer circumference thereof. An inverter housing section 8 into which the inverter device 7 can be integrally incorporated is integrally formed on the outer circumference of the housing 2 (on the motor housing 3 side). The inverter housing section 8 has a roughly square shape as seen in plan view and is configured so that the bottom surface thereof constitutes a partially substantially flat seating face 9 formed by the wall of the motor housing 3, and a flange 10 extends upward at the perimeter thereof.

The inverter housing section 8 is configured so as to be closed off by mounting a lid 11 on the flange 10, as illustrated in FIG. 3, after the inverter device 7 has been incorporated. A high-voltage cable (power source cable) 12 is provided on the inner surface of the lid 11. The high-voltage cable 12 has a connector 13 provided at one end thereof and a connector terminal 14 for connecting to a power source cable at the other end thereof. The connector 13 at one end is anchored in place on the inner surface of the lid 11 by a screw 15 at a position corresponding to a P-N terminal 24 provided upon a main circuit board 20, to be described hereafter, and the connector terminal 14 on the other end is anchored in place from the outer side by a plurality of screws 16, with the terminal portion protruding toward the outer surface of the lid 11.

The high-voltage cable 12 constitutes the power source cable and is connected via the power source cable to a power supply unit installed in the vehicle, and the connector 13 provided at one end thereof is for applying high-voltage direct-current power supplied from the power supply unit to the inverter device 7 by connecting to the P-N terminal 24 provided on the main circuit board 20 of the inverter device 7.

The inverter device 7 drives the electric motor by converting high-voltage direct-current power supplied from the power supply unit installed in the vehicle into three-phase alternating-current power of a specified frequency, and then applying the same to the electric motor. As illustrated in FIGS. 1 and 2, the inverter device 7 is integrated and incorporated into the inverter housing section 8, and is constituted by a plurality of high-voltage electrical components (hereinafter, also referred to simply as "electrical components") making up a noise-removing filter circuit, such as a coil 17 and a smoothing capacitor 18 housed within a case, a sub-circuit board 19, the main circuit board 20, and the like.

Figure 6:
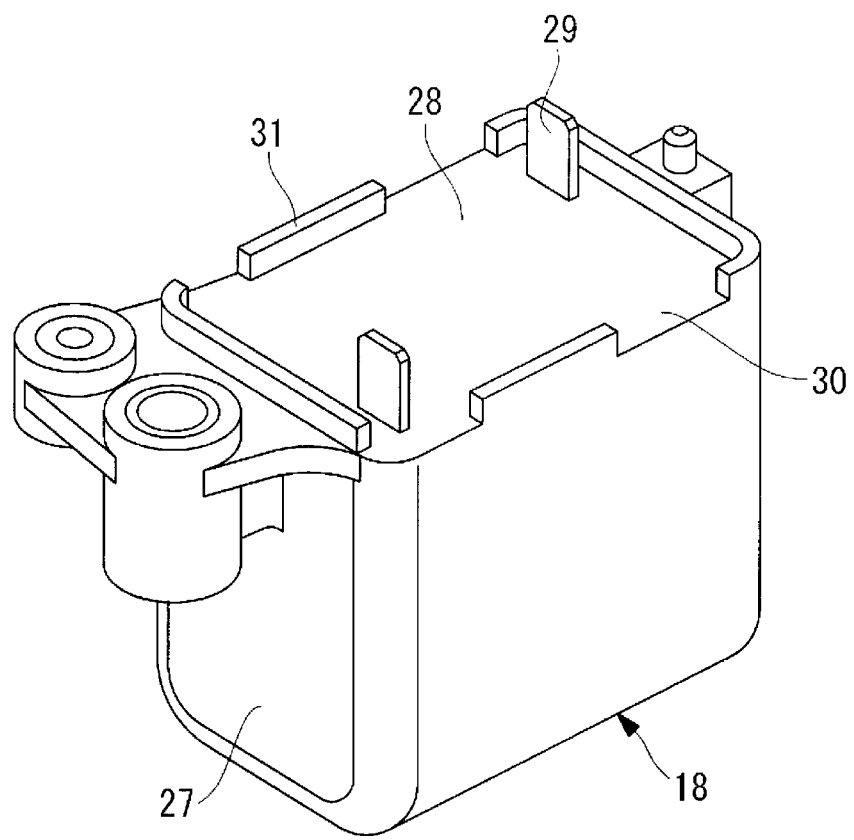
FIG. 6 is a perspective view of the high-voltage electrical component (smoothing capacitor) arranged at a position across from a P-N terminal on the main circuit board.

The inverter device 7 itself may be one known in the art; in this description, a device is used in which the plurality of electrical components making up the filter circuit, such as the coil 17 and the smoothing capacitor 18, are mounted to the main circuit board 20 via soldering to yield an integrated whole. The smoothing capacitor 18 is typically configured so as to be housed in a case. As illustrated in FIGS. 2 and 6, the smoothing capacitor 18 has a square (cuboid) outline, and the upper surface thereof has a substantially flat, planar shape. The electrical components such as the smoothing capacitor 18 and the coil 17 (for example, a common mode coil or normal mode coil) housed within the case are connected to a high voltage line formed by a wiring pattern on the main circuit board 20, and constitute a known noise-removing filter circuit.

A communication circuit 21 that is connected to a communication line extending from a host controller is mounted on the sub-circuit board 19, which is anchored in place in contact with the seating face 9 formed on a wall of the motor housing 3 constituting the bottom surface of the inverter housing section 8. The sub-circuit board 19 is electrically connected to the main circuit board 20.

A switching circuit (not illustrated) constituted by a plurality of switching elements such as IGBTs for converting direct-current power to three-phase alternating-current power is mounted on the main circuit board 20, as is a control circuit 22 that operates at low voltage, such as a CPU, for controlling the switching circuit and the like. The main circuit board 20 controls the operation of the inverter device 7 based on a control signal from an ECU installed on the vehicle, and is anchored in place within the inverter housing section 8 by a plurality of bolts 23. A P-N terminal 24 for inputting high-voltage direct-current power from the high-voltage cable 12 via the connector 13 and a UVW terminal 25 for outputting three-phase alternating-current power of a specified frequency that has been converted from the direct-current power are provided on the upper surface of the main circuit board 20.

The UVW terminal 25 is connected to a glass-sealed terminal 26 installed in the inverter housing section 8 that passes through the motor housing 3, and applies three-phase alternating-current power to the electric motor disposed within the motor housing 3 via the glass-sealed terminal 26.

The connector 13 provided on the lid 11 in correspondence with the P-N terminal 24 is inserted into the P-N terminal 24 so that the high-voltage line is connected; at least a certain degree of pressing force is necessary when inserting the connector 13, and the stress thereof is exerted on the main circuit board 20.

Figure 5:
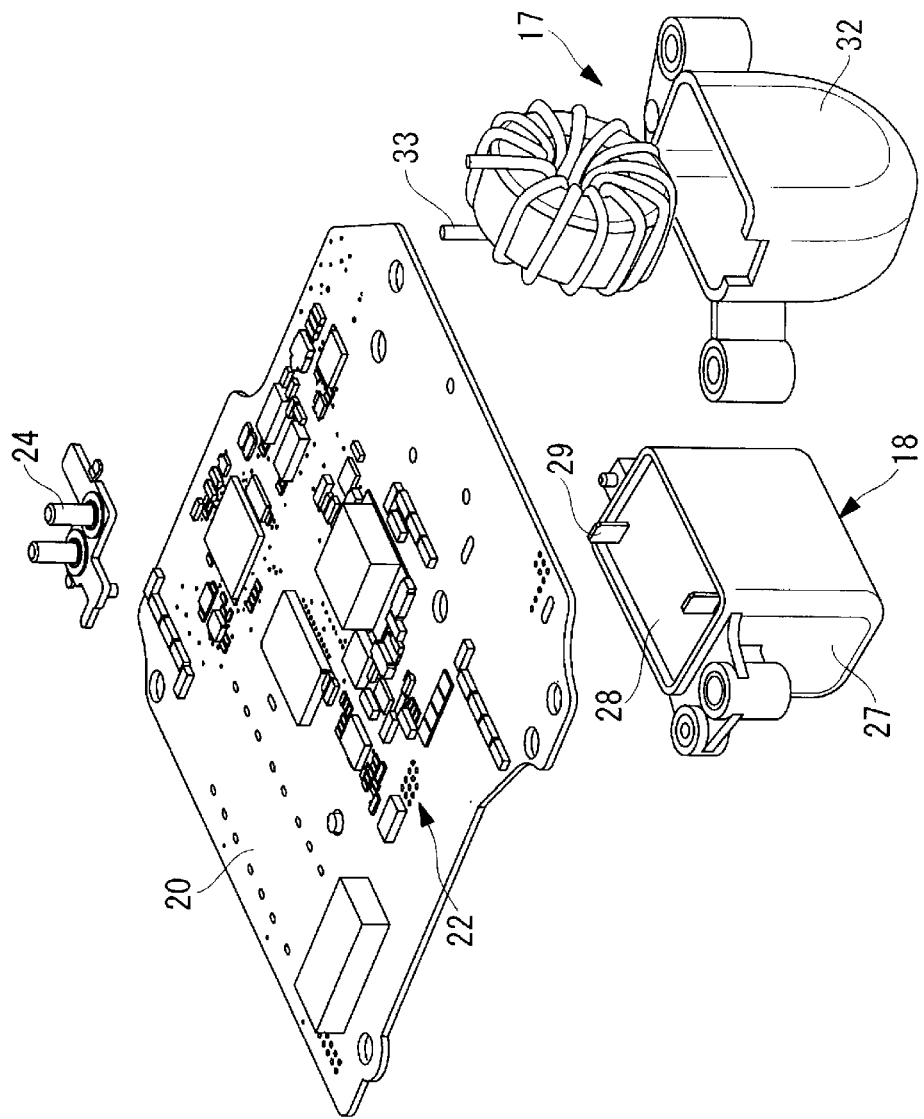
FIG. 5 is an exploded perspective view illustrating the relative positions of a main circuit board of the inverter device and a high-voltage electrical component arranged on the rear side of the main circuit board.

In the present embodiment, as illustrated in FIG. 5, the smoothing capacitor 18 constituting one of the high-voltage electrical components is provided on the rear side of the main circuit board 20 across from the position at which the P-N terminal 24 is disposed so as to bear the stress placed upon the main circuit board 20. The smoothing capacitor 18 has a square (cuboid) outline, and is configured so that the upper surface thereof bears stress applied to the main circuit board 20. As illustrated in FIG. 6, the smoothing capacitor 18 is housed within a resin case 27 having an open upper end, and is anchored therein by resin material 28 filling the case. A pair of terminals 29 protrudes from the surface of the resin material 28, and the smoothing capacitor 18 is mounted to the main circuit board 20 by soldering the terminals 29 to the main circuit board 20.

A plurality of recessed sections 30 and raised sections 31 are alternatingly provided on the circumferential edge of the opening in the rectangular upper end of the case 27 housing the smoothing capacitor 18 so that at least one raised section 31 is present on each side of the opening. The raised sections 31 support the underside of the main circuit board 20 at a position across from the P-N terminal 24 disposed on the upper surface of the main circuit board 20, and bear stress placed upon the main circuit board 20 when the connector 13 is inserted into the P-N terminal 24; meanwhile, the recessed sections 30 allow any resin material 28 filling the case 27 that overflows to escape therethrough when the smoothing capacitor 18 is being fabricated, thereby keeping the resin material 28 from affecting the dimensional precision of the upper surfaces of the raised sections 31.

The coil 17 constituting another of the high-voltage electrical components is housed in a resin case 32 having a roughly flat, planar upper surface, like the case 27 of the smoothing capacitor 18 and similarly anchored therein by a resin material, and is mounted to the main circuit board 20 by soldering both terminals 33 to the main circuit board 20. The cases 27, 32 of the coil 17 and the smoothing capacitor 18 are fastened in place by screws 34, 35 (see FIG. 1) at predetermined positions to the rear side of the main circuit board 20, allowing the coil 17 and smoothing capacitor 18 to be housed in the inverter housing section 8 along with the main circuit board 20 as an integrated whole, with the bottom portions thereof being anchored in place on the bottom surface of the inverter housing section 8 by a silicon adhesive or the like.

In the present embodiment, as described above, the smoothing capacitor 18 constituting one of the high-voltage electrical components constituting the inverter device 7 is disposed at a position on the rear side of the main circuit board 20 across from the P-N terminal 24 provided upon the main circuit board 20, the plurality of recessed sections 30 and raised sections 31 is provided on the circumferential edge of the opening in the upper end of the housing case 27 of the smoothing capacitor 18, and the raised sections 31 contact the undersurface of the main circuit board 20, thereby bearing stress placed upon the main circuit board 20 when the connector 13 is inserted into the P-N terminal 24. The smoothing capacitor 18 is thus capable of bearing stress upon the main circuit board 20 even when the connector 13 is inserted into the P-N terminal 24 with excessive pressing force.

Thus, in accordance with the present embodiment, stress placed upon the main circuit board 20 when the connector 13 provided at one end of the power source cable 12 is inserted into the P-N terminal 24 provided on the main circuit board 20 can be greatly reduced by bearing borne by the smoothing capacitor 18 constituting one of the high-voltage electrical components disposed at a position across from the P-N terminal 24 on the opposite side of the main circuit board 20, even when the power source cable 12 is directly connected to the main circuit board 20 via insertion of the connector 13.

It is thus possible to reliably eliminate the occurrence of damage and the like to the main circuit board 20 or the components mounted thereupon due to stress caused by exerting excessive pressing force when inserting the connector 13. In addition, the terminal block, busbar, and the like previously provided in the direct-current power input system are omitted, reducing the number of components in the inverter device 7, with the results that device configuration can be simplified, costs, size, and weight can be reduced, and the reduction in the number of busbar connections allows for a reduction in the number of manufacturing steps and improved reliability.

Because the plurality of raised and recessed sections (recessed sections 30 and raised sections 31) are provided on the circumferential edge of the opening in the upper end of the case 27 housing the smoothing capacitor 18 constituting one of the high-voltage electrical components, and the raised sections 31 support the undersurface of the main circuit board 20, any resin material 28 filling the case 27 that overflows can escape through the recessed sections 30 when the smoothing capacitor 18 is housed within the case 27 and anchored by the resin material 28, thus making it possible to eliminate any effects on the part of the resin material 28, maintain the dimensional precision of the upper surfaces of the raised sections 31 supporting the main circuit board 20, support the main circuit board 20 with high precision, and ensure precision in assembling the inverter device 7.

In the present embodiment, the high-voltage electrical component bearing stress placed upon the main circuit board 20 is the smoothing capacitor 18 constituting the noise-removing filter circuit provided on the high-voltage direct-current power line of the inverter device 7. Thus, the provision of the smoothing capacitor 18, which typically is housed within the case 27 and has a square outline, at a position across from the P-N terminal 24 on the opposite side of the main circuit board 20 allows the smoothing capacitor 18 to be used without modification as an electrical component for bearing stress placed upon the main circuit board 20.

Using an existing high-voltage electrical component constituting the filter circuit and modifying the manner in which the component is disposed so that it can be used as a member for bearing stress placed upon the main circuit board 20 in this way allows for an arrangement in which the connector 13 provided at one end of the power source cable 12 is directly connected to the P-N terminal 24 provided on the main circuit board 20, thereby allowing the number of parts, cost, size, weight, and the like of the inverter device 7 to be reduced.

The case 27 of the smoothing capacitor 18 has a rectangular shape as seen in plan view, and the plurality of recessed sections 30 and raised sections 31 provided on the circumferential edge of the opening in the upper end thereof are provided in alternation and so that at least one raised section 31 is present on each side. As a result, stress placed upon the main circuit board 20 when the connector 13 is inserted into the P-N terminal 24 can be dispersed and borne by the one or more raised sections 31 provided on each side of the rectangle-forming circumferential edge of the case 27, and any resin material 28 filling the case 27 that overflows when the smoothing capacitor 18 is housed within the case 27 and anchored by the resin material 28 during fabrication escapes through the recessed sections 30, thereby ensuring the dimensional precision of the upper surfaces of the raised sections 31 supporting the main circuit board 20.

Accordingly, stress placed upon the main circuit board 20 can be greatly mitigated, damage to the main circuit board 20 or the components mounted thereupon can be reliably prevented, the main circuit board 20 can be supported evenly and with high precision, and precision in assembling the inverter device 7 can be ensured.

The connector 13 provided at one end of the power source cable 12 is provided at a position corresponding to that of the P-N terminal 24 on the side of the lid 11 closing off the inverter housing section 8, and can be inserted into the P-N terminal 24 when the lid 11 is mounted into place. As a result, after the inverter device 7 has been set in position, the power source cable 12 can be simultaneously connected to the P-N terminal 24 of the inverter device 7 as the lid 11 is mounted in place, thus closing off the inverter housing section 8, by inserting the connector 13 disposed on the inner surface of the lid 11 into the P-N terminal 24. Accordingly, the connection structure of the power source cable 12 and the process of connecting the cable can be simplified, and the connector 13 can be reliably inserted into the P-N terminal 24 without the risk of placing excessive stress upon the main circuit board 20 even if the connector 13 is engaged by pressing on the lid 11 with somewhat excessive force.

The present invention is not limited to the invention according to the embodiment described above, and modifications can be made thereto as appropriate without departing from the gist thereof. For example, in the embodiment described above, an example has been described in which the electrical component disposed across from the P-N terminal 24 on the opposite side of the main circuit board 20 is the smoothing capacitor 18, but the present invention is not limited to such an arrangement; for example, the component may be the coil 17, such as a common mode coil or a normal mode coil, housed within the case 32, with the case 32 supporting the main circuit board 20, and effects similar to those described above can be obtained by adopting an arrangement for the case 32 in which a plurality of raised and recessed sections is provided on the circumferential edge of the opening in the upper end thereof, similarly to the case 27 of the smoothing capacitor 18.

In the foregoing description, the power source cable takes the form of the high-voltage cable 12, disposed inside the lid 11, to which a cable of the power source is connected, but a single cable may of course also be used. The inverter device 7 may be configured in any way as long as the P-N terminal 24 is provided on the main circuit board 20 and the power source cable is connected thereto. For example, the inverter device 7 may be configured as an integrated unit by means of a resin structure, and then incorporated into the inverter housing section 8.

REFERENCE SIGNS LIST

1 Inverter-integrated electric compressor
2 Housing
3 Motor housing

7 Inverter device
8 Inverter housing section
11 Lid
12 High-voltage cable (power source cable)
13 Connector
18 Smoothing capacitor (high-voltage electrical component)
20 Main circuit board
24 P-N terminal
27 Case
28 Resin material
30 Recessed section
31 Raised section

The invention claimed is:

1. An inverter-integrated electric compressor having an integrated inverter device incorporated in an inverter housing section provided on an outer circumference of a housing, the compressor comprising:
   a P-N terminal configured to input high-voltage direct-current power provided on a main circuit board of an inverter device, a power source cable being able to be connected by inserting a connector provided at one end of the power source cable into the P-N terminal; and
   a high-voltage electrical component constituting the inverter device provided at a position across from the P-N terminal on the opposite side of the main circuit board,
   the electrical component being housed within a case and anchored in place by a resin material, a plurality of raised and recessed sections being provided on a circumferential edge of an opening in an upper end of the case, and the raised sections being brought into contact with an undersurface of the main circuit board so as to bear stress placed upon the main circuit board when the connector is inserted.

2. The inverter-integrated electric compressor according to claim 1, wherein the electrical component is a smoothing capacitor constituting a noise-removing filter circuit provided on a high-voltage direct-current power line of the inverter device.

3. The inverter-integrated electric compressor according to claim 1, wherein the electrical component is a coil constituting a noise-removing filter circuit provided on a high-voltage direct-current power line of the inverter device.

4. The inverter-integrated electric compressor according to claim 1, wherein the case housing the electrical component has a rectangular shape as seen in plan view, and the plurality of raised and recessed sections provided on the circumferential edge of the opening in the upper end of the case is provided in alternation and so that at least one raised section is present on each side of the opening.

5. The inverter-integrated electric compressors according to claim 1, wherein the connector provided at the one end of the power source cable is provided at a position corresponding to that of the P-N terminal on the side of a lid for closing off the inverter housing section, and the connector can be inserted into the P-N terminal when the lid is mounted in place.

* * * * *